United States Patent
Beale

(10) Patent No.: US 9,432,975 B2
(45) Date of Patent: *Aug. 30, 2016

(54) TELECOMMUNICATIONS APPARATUS AND METHODS FOR HALF-DUPLEX AND FULL-DUPLEX

(71) Applicant: SCA IPLA HOLDINGS INC., New York, NY (US)

(72) Inventor: Martin Beale, Bristol (GB)

(73) Assignee: SCA IPLA HOLDINGS INC, New York, NY (US)

( * ) Notice: Subject to any disclaimer, the term of this patent is extended or adjusted under 35 U.S.C. 154(b) by 77 days.

This patent is subject to a terminal disclaimer.

(21) Appl. No.: 14/357,843

(22) PCT Filed: Dec. 17, 2012

(86) PCT No.: PCT/GB2012/053154
§ 371 (c)(1),
(2) Date: May 13, 2014

(87) PCT Pub. No.: WO2013/093434
PCT Pub. Date: Jun. 27, 2013

(65) Prior Publication Data
US 2014/0313945 A1      Oct. 23, 2014

(30) Foreign Application Priority Data

Dec. 22, 2011   (GB) .................................. 1122089.4

(51) Int. Cl.
*H04L 5/14*        (2006.01)
*H04W 72/04*    (2009.01)
(Continued)

(52) U.S. Cl.
CPC ........ *H04W 72/0406* (2013.01); *H04L 5/0053* (2013.01); *H04L 5/14* (2013.01); *H04L 5/16* (2013.01); *H04W 72/048* (2013.01); *H04B 7/2656* (2013.01); *H04L 5/0044* (2013.01)

(58) Field of Classification Search
None
See application file for complete search history.

(56) References Cited

U.S. PATENT DOCUMENTS

2002/0102948 A1    8/2002    Stanwood et al.
2006/0176966 A1    8/2006    Stewart et al.
(Continued)

FOREIGN PATENT DOCUMENTS

EP    2 093 903 A1    8/2009
GB    2487757 A        8/2012
(Continued)

OTHER PUBLICATIONS

U.S. Appl. No. 14/357,686, filed May 12, 2014, Beale.
(Continued)

*Primary Examiner* — Candal Elpenord
(74) *Attorney, Agent, or Firm* — Oblon, McClelland, Maier & Neustadt, L.L.P

(57) ABSTRACT

A telecommunications system including plural base stations and plural terminal devices communicating over a radio interface having a radio frame structure including radio subframes each including plural symbols. At least one symbol in each radio subframe is used to support a physical shared channel and at least one symbol in each radio subframe is used to support a physical control channel associated with the physical shared channel. A symbol at the end of each radio subframe is used to support the physical shared channel for communication links between a base station and a terminal device operating in a full-duplex mode, but the corresponding symbol is used to support a separate physical channel, for example an additional low-rate channel, for communication links operating in a half-duplex mode. Thus, transmission resources that would normally be idle in a half-duplex system compared to a full-duplex system can be re-used for another channel.

36 Claims, 7 Drawing Sheets

(51) Int. Cl.
  *H04L 5/16*  (2006.01)
  *H04B 7/26*  (2006.01)
  *H04L 5/00*  (2006.01)

(56) References Cited

U.S. PATENT DOCUMENTS

| | | | |
|---|---|---|---|
| 2008/0102779 A1 | 5/2008 | Stanwood et al. | |
| 2008/0107049 A1 | 5/2008 | Stanwood et al. | |
| 2008/0144542 A1 | 6/2008 | Stanwood et al. | |
| 2008/0144545 A1 | 6/2008 | Stanwood et al. | |
| 2010/0091726 A1* | 4/2010 | Ishii | H04L 1/18 370/329 |
| 2010/0202328 A1 | 8/2010 | Liu et al. | |
| 2010/0240400 A1* | 9/2010 | Choi | H04W 68/02 455/458 |
| 2012/0207038 A1* | 8/2012 | Choi | H04W 16/14 370/252 |
| 2013/0083704 A1* | 4/2013 | Gaal | H04L 5/001 370/277 |

FOREIGN PATENT DOCUMENTS

| | | | |
|---|---|---|---|
| GB | 2487780 | A | 8/2012 |
| GB | 2487782 | A | 8/2012 |
| GB | 2487906 | A | 8/2012 |
| GB | 2487907 | A | 8/2012 |
| GB | 2487908 | A | 8/2012 |
| GB | 2487909 | A | 8/2012 |
| GB | 2488513 | A | 9/2012 |
| WO | WO 02/23793 | A2 | 3/2002 |
| WO | WO 2007/020292 | A1 | 2/2007 |
| WO | WO 2011/116365 | A2 | 9/2011 |

OTHER PUBLICATIONS

Harri Holma, et al., "LTE for UMTS OFDMA and SC-FDMA based radio access", John Wiley and Sons, 2009, 4 Pages.
International Search Report issued Mar. 20, 2013 in PCT/GB2012/053154.
United Kingdom Search Report issued May 4, 2012 in Patent Application No. GB1122089.4.
Hard Holma, et al., "LTE for UMTS OFDMA and SC-FDMA based radio access", John Wiley and Sons, 2009, 4 Pages.
"Digital cellular telecommunications system (Phase 2+); Universal mobile telecommunications system (UMTS); LTE; Service requirements for machine-type communications (MTC); Stage 1 (3GPP TS 22.368 version 10.5.0 Release 10)", ETSI TS 122 368, V10.5.0, Jul. 2011, pp. 1-17 with cover page.
Japanese Office Action issued Jun. 7, 2016, in Japanese Patent Application No. 2014-548178.

* cited by examiner

TELECOMMUNICATIONS APPARATUS AND METHODS FOR HALF-DUPLEX AND FULL-DUPLEX

CROSS-REFERENCE TO RELATED APPLICATIONS

The present application is based on PCT filing PCT/GB2012/053154 filed Dec. 17, 2012, and claims priority to British Patent Application 1122089.4, filed in the UK IPO on 22 Dec. 2011, the entire contents of each of which being incorporated herein by reference.

BACKGROUND OF THE INVENTION

The present invention relates to methods, systems and apparatus for transmitting data in mobile telecommunications systems.

Third and fourth generation mobile telecommunications systems, such as those based on the 3GPP defined UMTS and Long Term Evolution (LTE) architecture are able to support more sophisticated services than simple voice and messaging services offered by previous generations of mobile telecommunications systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

FIG. 1 provides a schematic diagram illustrating some basic functionality of a conventional mobile telecommunications network/system operating in accordance with LTE principles and which may be modified to implement embodiments of the invention as described further below. The various elements of FIG. 1 and their respective modes of operation are well-known and defined in the relevant standards administered by the 3GPP®body and also described in many books on the subject, for example, Holma H. and Toskala A [1].

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single-carrier frequency division multiple access based interface for the radio uplink (so-called SC-FDMA). FIG. 2 shows a schematic diagram illustrating an OFDM-based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame. The PSS, SSS and PBCH are used, for example, during camp-on procedures.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth and is the first subframe in a frame (hence it contains PBCH). The smallest allocation of user data for transmission in LTE is a resource block comprising twelve sub-carriers transmitted over one subframe). For clarity, in FIG. 3, each individual resource element is not shown, instead each individual box in the subframe grid corresponds to twelve sub-carriers transmitted on one symbol.

FIG. 3 shows in hatching resource allocations for four LTE terminals 340, 341, 342, 343. For example, the resource allocation 342 for a first LTE terminal (UE1) extends over five blocks of twelve sub-carriers (i.e. 60 sub-carriers), the resource allocation 343 for a second LTE terminal (UE2) extends over six blocks of twelve sub-carriers and so on.

Physical layer control information is transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for a channel bandwidth of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe.

FIG. 3 also shows a region of PDSCH containing system information and extending over a bandwidth of $R_{344}$. A conventional LTE subframe will also include reference signals which are not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the subframe to provide for frequency diversity.

Whereas FIGS. 2 and 3 relate to the downlink frame structure in a conventional LTE telecommunications system, a broadly similar frame structure is employed for the uplink in terms of how the available time and frequency resources are divided into time and frequency elements which are allocated to different channels, such as the PUCCH (physical uplink control channel) and PUSCH (physical uplink shared channel).

There are a number of different operating modes for telecommunications systems which derive from the two-way nature of communications between a base station and a terminal device. In particular, telecommunications systems may operate in a Time Division Duplex (TDD) mode or a Frequency Division Duplex (FDD) mode, and furthermore communications between a base station and a terminal device may be half-duplex or full-duplex.

A half-duplex mode of operation is one in which communications from the base station to the terminal device (downlink communications) and communications from the terminal device to the base station (uplink communications) are not made simultaneously. That is to say, the terminal device does not transmit and receive at the same time. The base station also does not simultaneously transmit and receive with respect to a given terminal device (although in principle a base station supporting half-duplex communications with individual terminal devices may transmit to one terminal device while simultaneously receiving from another terminal device).

A full-duplex mode of operation is one in which downlink and uplink communications associated with a particular terminal device may be made simultaneously. That is to say, the terminal device and base station are able to transmit to and receive from one another at the same time.

A TDD mode of operation is one in which downlink and uplink communications are made at different times using the same frequencies. A TDD mode of operation is thus a half-duplex mode.

An FDD mode of operation is one in which downlink and uplink communications are made using different frequencies. An FDD mode of operation may be half-duplex or full-duplex.

Various advantages and disadvantages associated with each of these different potential modes of operation are well known.

FIG. 4 schematically represents a particular issue that arises with half-duplex communications which can give rise to wasted transmission resources. FIG. 4 schematically represents two subframes in a telecommunications system supporting half-duplex communications between a base station and a terminal device. In this example it is assumed the telecommunications system is an LTE-compliant system, for example as shown in FIGS. 1 to 3. In FIG. 4, time extends from left to right and it is assumed a downlink subframe occurs between times T1 and T2 and an uplink subframe occurs between times T2 and T3. The times T1, T2 and T3 are the times of subframe boundaries according to the base station clock.

As schematically shown in FIG. 4, the downlink subframe comprises 14 symbols (the operating bandwidth is not significant here). The downlink subframe is represented twice in FIG. 4. The upper representation is marked BS:DL (base station downlink) and represents the downlink subframe as transmitted by the base station. This is properly registered with the subframe boundaries at T1 and T2. The lower representation of the downlink subframe is marked UE:DL (user equipment downlink) and represents the downlink subframe as received by the terminal device (user equipment). The downlink subframe as received by the terminal device is not registered properly with the subframe boundaries at T1 and T2 according to the base station clock. This is because of a propagation delay Δp corresponding to the time taken for the radio signals to reach the terminal device from the base station.

As schematically shown in FIG. 4, the uplink subframe also comprises 14 symbols (the operating bandwidth is again not significant here). The uplink subframe is also represented twice in FIG. 4. The lower representation is marked BS:UL (base station uplink) and represents the uplink subframe as received by the base station. In accordance with standard techniques, the telecommunications system is configured to operate such that the uplink subframe as received by the base station (BS:UL) is properly registered with the subframe boundaries at T2 and T3. Thus, so far as the base station is concerned, reception of the uplink subframe starts as soon as transmission of the downlink subframe is complete. To achieve this, it is necessary for the terminal device to begin transmission of the uplink subframe before T2 to allow for the uplink propagation delay. This is called timing advance. Thus the upper representation of the uplink subframe in FIG. 4 is marked UE:UL (user equipment uplink) and represents the uplink subframe as transmitted by the terminal device (user equipment). For the beginning of the uplink subframe to arrive at the base station at time T2, transmission by the terminal device starts at a time T2−Δp (it is assumed here the uplink propagation delay is the same as the downlink propagation delay).

As can be seen in FIG. 4, the downlink and uplink propagation delays mean that the end of the downlink subframe as seen by the terminal device is after the beginning of the uplink subframe as transmitted by the terminal device. Thus the terminal device sees an overlap of twice the propagation delay between the end of the downlink subframe (UE:DL) and the beginning of the uplink subframe (UE:UL). In a half-duplex mode of operation the terminal device cannot transmit and receive at the same time, and so the terminal device cannot receive during the overlap period when it has started transmitting the uplink subframe. What is more, it is generally not possible for a terminal device to switch instantaneously from reception to transmission. Because of this there will be a period of time between reception and transmission during which data cannot be received or sent. This switching period (Δs) is schematically shown by a black region 400 at the beginning of the representation of the uplink subframe as seen by the terminal device in FIG. 4. (It should be noted the various time periods in FIG. 4 are not necessarily shown to scale.)

The net result of the downlink propagation delay, the need for timing advance in the uplink, and the switching delay is a combined period $\Delta t$ (=$2\Delta p+\Delta s$) during which a terminal device operating in half-duplex mode is unable to receive data at the end of a downlink subframe. This period is schematically represented in FIG. 4 by grey shading towards the end of the downlink subframe representations (BS:DL, UE:DL). To take account of this issue it is known for terminal devices to in effect puncture downlink subframes to introduce idle symbols during which no data is received by the terminal device. The number of idle symbols will depend on the magnitude of the switching and propagation delays. Typically, there will be one or two idle symbols. In the example shown in FIG. 4, two idle symbols are required, and these are schematically shown as containing a cross. Even for terminal devices having low switching times and which are relatively close to the base station and (hence subject to relatively short propagation delays), there will be at least one idle symbol. This represents a loss of around 7% of the available physical transmission resources.

FIG. 4 shows the introduction of idle symbols at the end of the downlink subframe in accordance with established techniques. It will be appreciated however that idle symbols might instead be introduced at the beginning of an uplink subframe to allow for the inability of a terminal device to transmit and receive at the same time.

One way to avoid the need for idle symbols would be to restrict the scheduling of uplink and downlink subframes for terminal devices operating in half-duplex mode to ensure a particular terminal device was never scheduled for uplink in a subframe immediately following one in which the terminal device was scheduled for downlink. However, this reduces the maximum data rate that can be sustained for a given terminal device, and furthermore introduces complexity into the scheduling procedures resulting in reduced scheduling flexibility.

Accordingly, there is a need for improved techniques for addressing the above-identified issues with half-duplex operation in telecommunications systems.

SUMMARY OF THE INVENTION

In accordance with an aspect of the invention there is provided a telecommunications system comprising a plurality of base stations and a plurality of terminal devices arranged to communicate over a radio interface having a radio frame structure comprising radio subframes, wherein each radio subframe comprises a plurality of symbols, and at least one symbol in each radio subframe is used to support a physical shared channel and at least one symbol in each radio subframe is used to support a physical control channel associated with the physical shared channel, and wherein a symbol at the beginning or end of each radio subframe is used for a communication link between a base station and a terminal device operating in a full-duplex mode to support the physical shared channel and is used for a communication link between a base station and a terminal device operating in a half-duplex mode to support a different additional physical channel.

The additional physical channel may be used to support half-duplex or full duplex communications.

In accordance with some embodiments the radio subframes are downlink radio subframes and the symbol supporting the physical shared channel or the additional physical channel in dependence on whether a communication link is operating in a half-duplex or full-duplex mode is at the end of the radio subframes.

In accordance with some embodiments the additional physical channel has a transmission time interval (TTI) spanning a plurality of radio subframes.

In accordance with some embodiments the additional physical channel is used to support communications associated with a subset of the terminal devices.

In accordance with some embodiments the subset of terminal devices supported by the additional physical channel comprises machine-type communication, MTC, devices.

In accordance with some embodiments the subset of terminal devices supported by the additional physical channel comprises terminal devices in a dormant state.

In accordance with some embodiments the additional physical channel is used to support broadcast/multicast signaling.

In accordance with some embodiments the additional physical channel is used to indicate the availability of an additional carrier.

In accordance with some embodiments the additional physical channel is further used to indicate characteristics of the additional carrier.

In accordance with some embodiments the additional physical channel is used to indicate system information relating to the radio interface.

In accordance with some embodiments the additional physical channel is used to carry paging messages to terminal devices.

In accordance with some embodiments the additional physical channel in a radio subframe is used to provide control information for the physical shared channel in a subsequent radio subframe.

In accordance with some embodiments symbols associated with the additional physical channel from a plurality of radio subframes are treated as a group as a radio subframe associated with the additional physical channel.

In accordance with some embodiments the additional physical channel in one radio subframe provides an additional control channel for allocating transmission resources associated with the additional physical channel in other radio subframes to respective ones of the terminal devices.

In accordance with some embodiments a symbol adjacent to a symbol used to support the additional physical channel is also used to support the additional physical channel.

In accordance with an aspect of the invention there is provided a method of communicating data in a telecommunications system comprising a plurality of base stations and a plurality of terminal devices arranged to communicate over a radio interface, the method comprising: transmitting data using a first radio frame structure for a communication link between a base station and a terminal device operating in a full-duplex mode; transmitting data using a second radio frame structure for a communication link between a base station and a terminal device operating in a half-duplex mode, wherein the first and second radio frame structures both comprise radio subframes comprising a plurality of symbols wherein at least one symbol in each radio subframe is used to support a physical shared channel and at least one symbol in each radio subframe is used to support a physical control channel associated with the physical shared channel, and wherein a symbol at the beginning or end of each radio subframe of the first radio frame structure is used to support the physical shared channel whereas a corresponding symbol at the beginning or end of each radio subframes of the second radio frame structure is used to support a different additional physical channel.

In accordance with some embodiments the radio subframes are downlink radio subframes and the symbol supporting the physical shared channel or the additional physical channel in dependence on whether a communication link is operating in a half-duplex full-duplex mode is at the end of the radio subframes.

In accordance with some embodiments the additional physical channel has a transmission time interval (TTI) spanning a plurality of radio subframes.

In accordance with some embodiments the additional physical channel is used to support communications associated with a subset of the terminal devices.

In accordance with some embodiments the subset of terminal devices supported by the additional physical channel comprises machine-type communication, MTC, devices.

In accordance with some embodiments the subset of terminal devices supported by the additional physical channel comprises terminal devices in a dormant state.

In accordance with some embodiments the additional physical channel is used to support broadcast/multicast signaling.

In accordance with some embodiments the additional physical channel is used to indicate the availability of an additional carrier.

In accordance with some embodiments the additional physical channel is further used to indicate characteristics of the additional carrier.

In accordance with some embodiments the additional physical channel is used to indicate system information relating to the radio interface.

In accordance with some embodiments the additional physical channel is used to carry paging messages to terminal devices.

In accordance with some embodiments the additional physical channel in a radio subframe is used to provide control information for the physical shared channel in a subsequent radio subframe.

In accordance with some embodiments symbols associated with the additional physical channel from a plurality of radio subframes are treated as a group as a radio subframe associated with the additional physical channel.

In accordance with some embodiments the additional physical channel in one radio subframe provides an additional control channel for allocating transmission resources associated with the additional physical channel in other radio subframes to respective ones of the terminal devices.

In accordance with some embodiments a symbol adjacent to a symbol used to support the additional physical channel is also used to support the additional physical channel.

In accordance with an aspect of the invention there is provided a base station for use in a telecommunications system comprising a plurality of base stations and a plurality of terminal devices arranged to communicate over a radio interface having a radio frame structure comprising radio subframes, wherein each radio subframe comprises a plurality of symbols, and at least one symbol in each radio subframe is used to support a physical shared channel and at least one symbol in each radio subframe is used to support a physical control channel associated with the physical shared channel, and wherein a symbol at the beginning or end of each radio subframe is used to support the physical shared channel in a communication cell supporting terminal devices operating in a full-duplex communication mode and is used to support a different additional physical channel in a communication cell supporting terminal devices operating in a half-duplex communication mode, wherein the base station is in a communication cell supporting terminal devices operating in a half-duplex communication mode and is operable to communicate with terminal devices using the additional physical channel.

In accordance with an aspect of the invention there is provided a method of operating a base station in a telecommunications system comprising a plurality of base stations and a plurality of terminal devices arranged to communicate over a radio interface having a radio frame structure comprising radio subframes, wherein each radio subframe comprises a plurality of symbols, and at least one symbol in each radio subframe is used to support a physical shared channel and at least one symbol in each radio subframe is used to support a physical control channel associated with the physical shared channel, and wherein a symbol at the beginning or end of each radio subframe is used to support the physical shared channel in a communication cell supporting terminal devices operating in a full-duplex communication mode and is used to support a different additional physical channel in a communication cell supporting terminal devices operating in a half-duplex communication mode, wherein the base station is in a communication cell supporting terminal devices operating in a half-duplex communication mode, and wherein the method comprises communicating with terminal devices using the additional physical channel.

In accordance with an aspect of the invention there is provided a base station arranged to communicate with terminal devices over a radio interface operating in a mode that supports half-duplex mode terminal devices, wherein the base station comprises a transceiver operable to communicate via the radio interface by transmission and/or reception of radio subframes, wherein each radio subframe comprises a plurality of symbols, and at least one symbol in each radio subframe is used to support a physical shared channel and at least one symbol in each radio subframe is used to support a physical control channel associated with the physical shared channel, and wherein a symbol at the beginning or end of each radio subframe is used to support a different additional physical channel.

In accordance with an aspect of the invention there is provided a method of operating a base station for communicating with terminal devices over a radio interface operating in a mode that supports half-duplex mode terminal devices, wherein the method comprises transmitting and/or receiving radio subframes via the radio interface, wherein each radio subframe comprises a plurality of symbols, and at least one symbol in each radio subframe is used to support a physical shared channel and at least one symbol in each radio subframe is used to support a physical control channel associated with the physical shared channel, and wherein a symbol at the beginning or end of each radio subframe is used to support a different additional physical channel.

In accordance with an aspect of the invention there is provided a terminal device for use in a telecommunications system comprising a plurality of base stations and a plurality of terminal devices arranged to communicate over a radio interface having a radio frame structure comprising radio subframes, wherein each radio subframe comprises a plurality of symbols, and at least one symbol in each radio subframe is used to support a physical shared channel and at least one symbol in each radio subframe is used to support a physical control channel associated with the physical shared channel, and wherein a symbol at the beginning or end of each radio subframe is used in a communication cell supporting terminal devices operating in a full-duplex communication mode to support the physical shared channel and is used in a communication cell supporting terminal devices operating in a half-duplex communication mode to support a different additional physical channel, wherein the terminal device is configured such that it is operable to communicate with a base station using the additional physical channel in a communication cell supporting terminal devices operating in a half-duplex communication mode.

In accordance with some embodiments the radio subframes are downlink radio subframes and the symbol supporting the additional physical channel in a communication cell supporting terminal devices operating in a half-duplex communication mode is at the end of the radio subframes.

In accordance with some embodiments the additional physical channel has a transmission time interval (TTI) spanning a plurality of radio subframes.

In accordance with some embodiments the terminal device is one of a subset of the plurality of terminal devices for which the additional physical channel is used to support communications.

In accordance with some embodiments the subset of terminal devices supported by the additional physical channel comprises machine-type communication, MTC, devices.

In accordance with some embodiments the subset of terminal devices supported by the additional physical channel comprises terminal devices in a dormant state.

In accordance with some embodiments the additional physical channel is used to support broadcast/multicast signaling.

In accordance with some embodiments the additional physical channel is used to indicate the availability of an additional carrier.

In accordance with some embodiments the additional physical channel is further used to indicate characteristics of the additional carrier.

In accordance with some embodiments the additional physical channel is used to indicate system information relating to the radio interface.

In accordance with some embodiments the additional physical channel is used to carry paging messages to terminal devices.

In accordance with some embodiments the additional physical channel in a radio subframe is used to provide control information for the physical shared channel in a subsequent radio subframe.

In accordance with some embodiments symbols associated with the additional physical channel from a plurality of radio subframes are treated as a group as a radio subframe associated with the additional physical channel.

In accordance with some embodiments the additional physical channel in one radio subframe provides an additional control channel for allocating transmission resources associated with the additional physical channel in other radio subframes for the terminal device.

In accordance with some embodiments a symbol adjacent to a symbol used to support the additional physical channel is also used to support the additional physical channel.

In accordance with some embodiments the terminal device is further operable to communicate with a base station using the physical control channel and the physical shared channel.

In accordance with an aspect of the invention there is provided a method of operating a terminal device in a telecommunications system comprising a plurality of base stations and a plurality of terminal devices arranged to communicate over a radio interface having a radio frame structure comprising radio subframes, wherein each radio subframe comprises a plurality of symbols, and at least one symbol in each radio subframe is used to support a physical shared channel and at least one symbol in each radio subframe is used to support a physical control channel associated with the physical shared channel, and wherein a symbol at the beginning or end of each radio subframe is used in a communication cell supporting terminal devices operating in a full-duplex communication mode to support the physical shared channel and is used in a communication cell supporting terminal devices operating in a half-duplex communication mode to support a different additional physical channel, wherein the method comprises communicating with a base station using the additional physical channel in a communication cell supporting terminal devices operating in a half-duplex communication mode.

In accordance with some embodiments the radio subframes are downlink radio subframes and the symbol supporting the additional physical channel in a communication cell supporting half-duplex communications is at the end of the radio subframes.

In accordance with some embodiments the additional physical channel has a transmission time interval (TTI) spanning a plurality of radio subframes.

In accordance with some embodiments the terminal device is one of a subset of the plurality of terminal devices for which the additional physical channel is used to support communications.

In accordance with some embodiments the subset of terminal devices supported by the additional physical channel comprises machine-type communication, MTC, devices.

In accordance with some embodiments the subset of terminal devices supported by the additional physical channel comprises terminal devices in a dormant state.

In accordance with some embodiments the additional physical channel is used to support broadcast/multicast signaling.

In accordance with some embodiments the additional physical channel is used to indicate the availability of an additional carrier.

In accordance with some embodiments the additional physical channel is further used to indicate characteristics of the additional carrier.

In accordance with some embodiments the additional physical channel is used to indicate system information relating to the radio interface.

In accordance with some embodiments the additional physical channel is used to carry paging messages to terminal devices.

In accordance with some embodiments the additional physical channel in a radio subframe is used to provide control information for the physical shared channel in a subsequent radio subframe.

In accordance with some embodiments symbols associated with the additional physical channel from a plurality of radio subframes are treated as a group as a radio subframe associated with the additional physical channel.

In accordance with some embodiments the additional physical channel in one radio subframe provides an additional control channel for allocating transmission resources associated with the additional physical channel in other radio subframes for the terminal device.

In accordance with some embodiments a symbol adjacent to a symbol used to support the additional physical channel is also used to support the additional physical channel.

In accordance with some embodiments the terminal device is further operable to communicate with a base station using the physical control channel and the physical shared channel.

In accordance with an aspect of the invention there is provided a terminal device arranged to communicate with a base station over a radio interface operating in a mode that supports half-duplex mode terminal devices, wherein the terminal device comprises a transceiver operable to communicate via the radio interface by transmission and/or reception of radio subframes, wherein each radio subframe comprises a plurality of symbols, and at least one symbol in each radio subframe is used to support a physical shared channel and at least one symbol in each radio subframe is used to support a physical control channel associated with the physical shared channel, and wherein a symbol at the beginning or end of each radio subframe is used to support a different additional physical channel.

In accordance with an aspect of the invention there is provided a method of operating a terminal device for communicating with a base station over a radio interface operating in a mode that supports half-duplex mode terminal devices, wherein the method comprises transmitting and/or receiving radio subframes via the radio interface, wherein each radio subframe comprises a plurality of symbols, and at least one symbol in each radio subframe is used to support a physical shared channel and at least one symbol in each radio subframe is used to support a physical control channel associated with the physical shared channel, and wherein a symbol at the beginning or end of each radio subframe is used to support a different additional physical channel.

It will be appreciated that features and aspects of the invention described above in relation to the first aspects of the invention are equally applicable and may be combined with other aspects of the invention as appropriate.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Embodiments of the invention are based on the inventor's realisation that radio frame symbols that would otherwise be idle in a half-duplex mode of operation may nonetheless be used to support communications. In some respects this may be seen as the re-use of idle symbols of a half-duplex communications link to provide for an additional communication channel.

Figure 5:
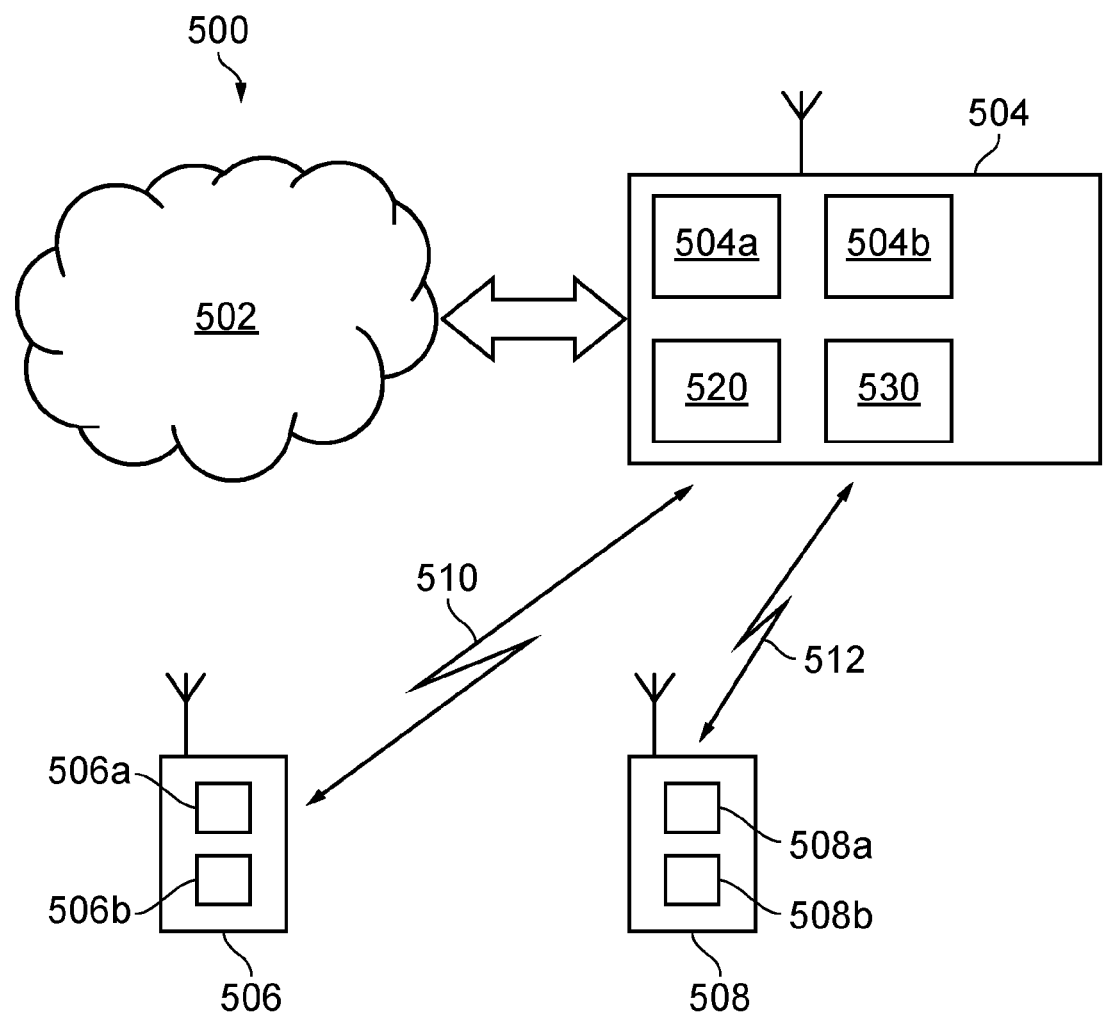
FIG. 5 schematically represents a wireless telecommunications system according to an embodiment of the invention.

FIG. 5 schematically shows a telecommunications system 500 according to an embodiment of the invention. The telecommunications system 500 in this example is based broadly on an LTE-type architecture. As such many aspects of the operation of the telecommunications system 500 are standard and well understood and not described here in detail in the interest of brevity. Operational aspects of the telecommunications system 500 which are not specifically described below may be implemented in accordance with any known techniques, for example according to the LTE-standards.

The telecommunications system 500 comprises a core network part (evolved packet core) 502 coupled to a radio network part. The radio network part comprises a base station (evolved-nodeB) 504, a first terminal device 506 and a second terminal device 508. It will of course be appreciated that in practice the radio network part will comprise a plurality of base stations serving a larger number of terminal devices across various communication cells. However, only a single base station and two terminal devices are shown in FIG. 5 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the evolved packet system (EPS) connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 5 may be broadly conventional apart from where modified to provide functionality in accordance with embodiments of the invention as discussed herein.

In this example, it is assumed the first terminal device 506 is a conventional smart-phone type terminal device communicating with the base station 504 in a half-duplex mode of operation. Thus, and as is conventional, the terminal device 504 comprises a transceiver unit 506a for transmission and reception of wireless signals and a controller unit 506b configured to control the smart phone 506. The controller unit 506b may comprise a processor unit which is suitably configured/programmed to provide the desired functionality using conventional programming/configuration techniques for equipment in wireless telecommunications systems. The transceiver unit 506a and the controller unit 506b are schematically shown in FIG. 5 as separate elements. However, it will be appreciated that the functionality of these units can be provided in various different ways, for example using a single suitably programmed integrated circuit. It will be appreciated, the smart phone 506 will in general comprise various other elements associated with its operating functionality.

In this example, it is assumed the second terminal device 508 is a machine-type communication (MTC) terminal device. These types of device are typically semi-autonomous or autonomous wireless communication devices communicating small amounts of data on a relatively infrequent basis. Examples include so-called smart meters which, for example, are located in a customer's house and periodically transmit information back to a central MTC server data relating to the customer's consumption of a utility such as gas, water, electricity and so on. Further information on characteristics of MTC-type devices can be found, for example, in the corresponding standards, such as ETSI TS 122 368 V10.530 (2011-07)/3GPP TS 22.368 version 10.5.0 Release 10) [2]. Thus, MTC devices may in some respects be seen as devices which can be supported by relatively low bandwidth communication channels having relatively low quality of service (QoS), for example in terms of latency. It is assumed here the MTC terminal device 508 in FIG. 5 is such a device.

As with the smart phone 506, the MTC device 508 comprises a transceiver unit 508a for transmission and reception of wireless signals and a controller unit 508b configured to control the MTC device 508. The controller unit 508b may comprise a processor unit which is suitably configured/programmed to provide the desired functionality described herein using conventional programming/configuration techniques for equipment in wireless telecommunications systems. The transceiver unit 508a and the controller unit 508b are schematically shown in FIG. 5 as separate elements for ease of representation. However, it will be appreciated that the functionality of these units can be provided in various different ways following established practices in the art, for example using a single suitably programmed integrated circuit. It will be appreciated the MTC device 508 will in general comprise various other elements associated with its operating functionality.

The base station 504 comprises a transceiver unit 504a for transmission and reception of wireless signals and a controller unit 504b configured to control the base station 504. The controller unit 504b may comprise a processor unit which is suitably configured/programmed to provide the desired functionality described herein using conventional programming/configuration techniques for equipment in wireless telecommunications systems. The transceiver unit 504a and the controller unit 504b are schematically shown in FIG. 5 as separate elements for ease of representation. However, it will be appreciated that the functionality of these units can be provided in various different ways following established practices in the art, for example using a single suitably programmed integrated circuit. It will be appreciated the base station 504 will in general comprise various other elements associated with its operating functionality.

Thus, the base station 504 is configured to communicate data with the smart phone 506 over a first radio communication link 510 and communicate data with the MTC device 508 over a second radio communication link 512.

Figure 6A:
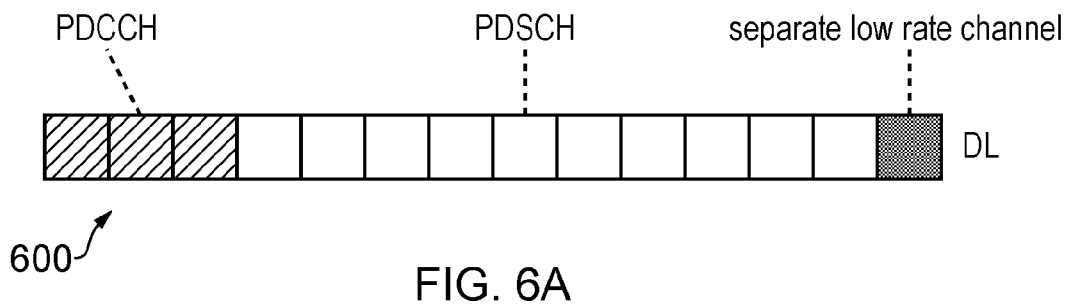
FIG. 6A schematically represents a downlink subframe transmitted by a base station in the wireless telecommunications system of FIG. 5.

FIG. 6A schematically represents a subframe 600 of the frame structure used for downlink communications from the base station 504 to the terminal devices 506, 508 in accordance with an embodiment of the invention. The overall downlink frame structure for the base station 504 in terms of time and frequency division of the available downlink resources follows that of a conventional LTE network. That is to say, the downlink frame structure is based around subframes comprising 14 symbols (when a normal cyclic prefix is applied) and FIG. 6A represents the symbols of one such subframe spanning an arbitrary number of OFDM sub-carriers.

The base station 504 is configured to communicate with the smart phone 506 in a manner which broadly corresponds with how a conventional base station would communicate with a conventional terminal device operating over a half-duplex radio link in an LTE system, and the transmitted subframe 600 has corresponding similarities. Thus, the transmitted subframe 600 shown in FIG. 6A comprises 14 symbols (corresponding to the case of a normal cyclic prefix). In this example three symbols are allocated to physical downlink control channels (PDCCH) for controlling (i.e. providing allocation information) for downlink transmission grants to specific terminal devices on other symbols of the subframe 600 supporting a physical downlink shared channel (PDSCH) (as well as uplink grants). The base station 504 includes a first scheduler 520 responsible for managing the allocations of resources on PDSCH to various terminal devices, such as the smart phone 506, supported by this channel. In the example of FIG. 6A, the symbols allocated to PDCCH are shown with diagonal hatching, and the symbols allocated to PDSCH are shown with no hatching. The symbols allocated to PDSCH in the subframe 600 of FIG. 6A differ from those allocated to PDSCH in a conventional LTE system in that the last symbol in the subframe is not allocated to PDSCH. This last symbol is instead separately allocated to support an additional physical channel, which may be referred to in some examples as a separate low-rate channel. The symbol allocated to the separate low-rate channel is schematically represented in FIG. 6A by dot-shading. There is no provision in a conventional LTE system for such a separate low-rate channel. In accordance with an embodiment of the invention, the base station 504 transmits higher layer data to the conventional smart phone terminal device 506 using the symbols allocated to PDSCH according to allocations carried on PDCCH. (In general the higher-layer data transmitted on PDSCH conveys a combination of user-plane data and non-physical layer control-plane data (such as Radio Resource Control (RRC) and Non Access Stratum (NAS) signaling). The user-plane data and non-physical layer control-plane data conveyed on PDSCH may be referred to as higher layer data (i.e. data associated with a layer higher than the physical layer). The underlying mechanisms and communication protocols for this functionality may broadly follow conventional techniques. In this example, the separate low-rate channel is not used for communicating with the smart phone terminal device 506, but is used for communicating with the MTC terminal device 508.

Figure 1:
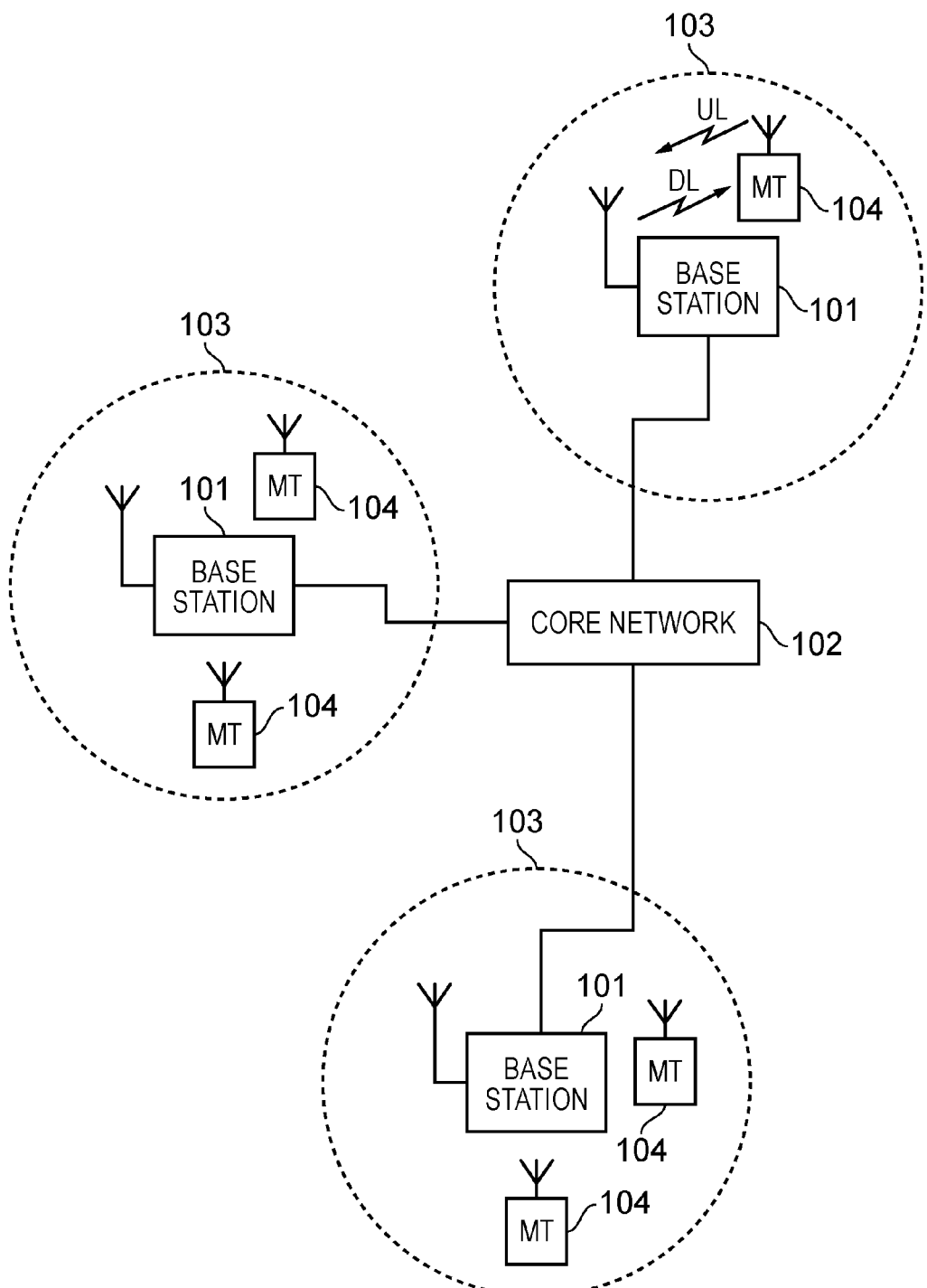
FIG. 1 provides a schematic diagram illustrating an example of a conventional mobile telecommunication network.
Figure 2:
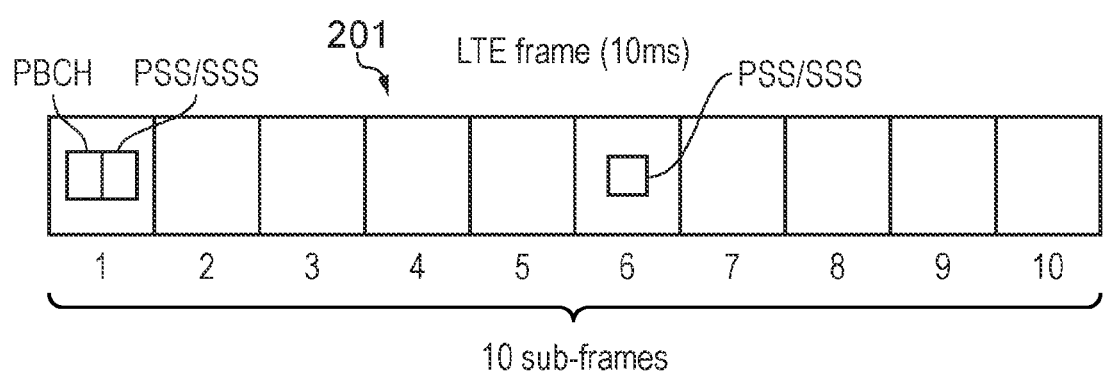
FIG. 2 provides a schematic diagram illustrating a conventional LTE radio frame.
Figure 3:
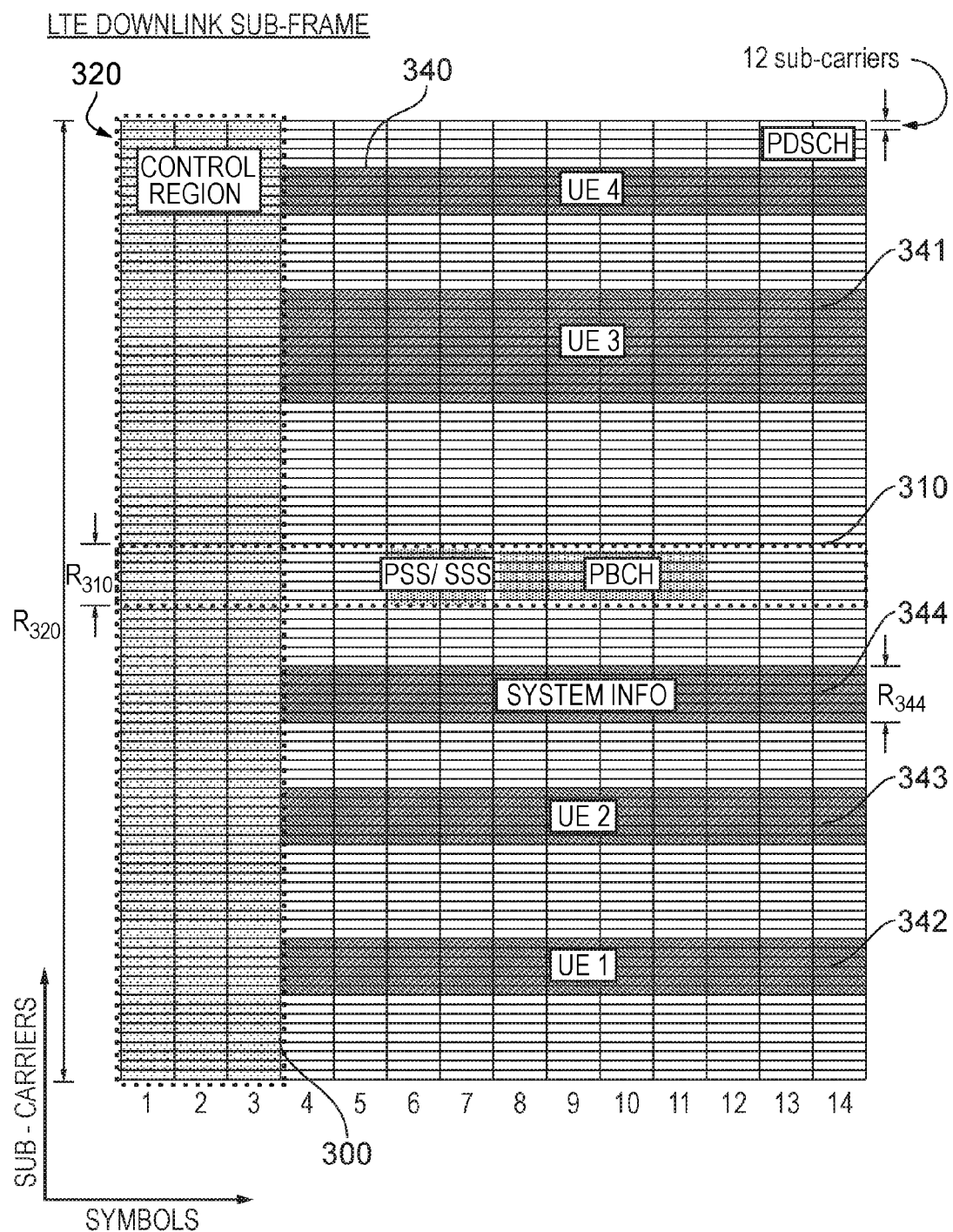
FIG. 3 provides a schematic diagram illustrating an example of a conventional LTE downlink radio subframe.
Figure 4:
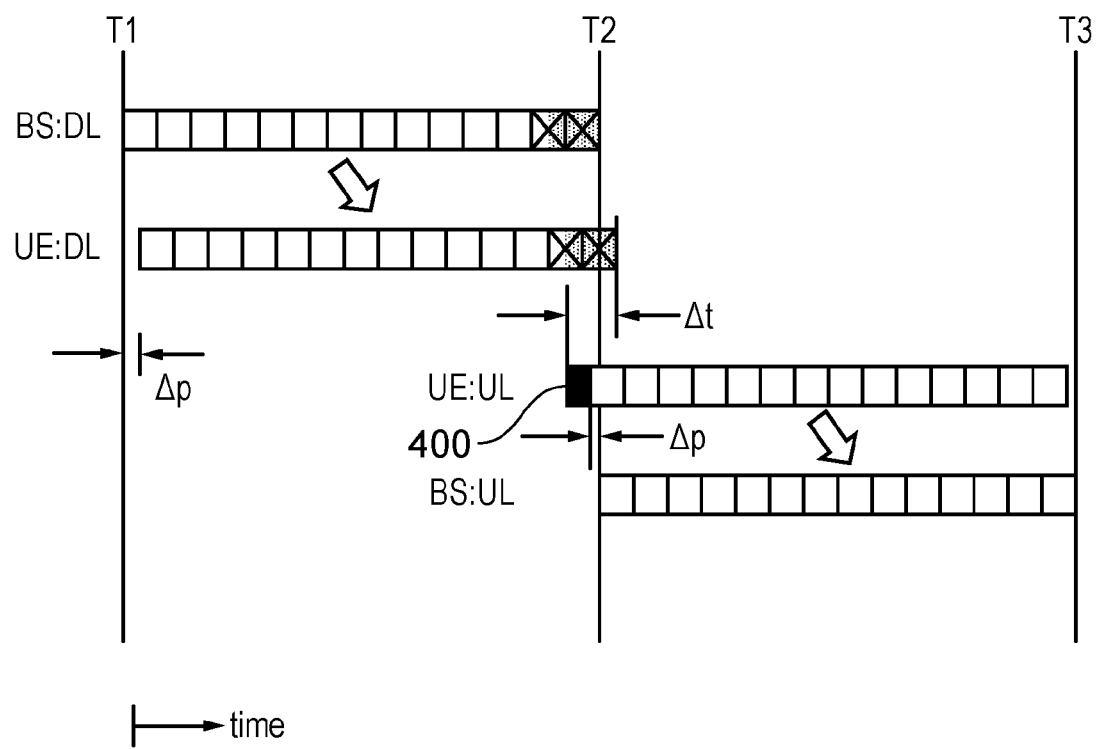
FIG. 4 schematically represents two subframes of a telecommunications system supporting half-duplex communications between a base station and a terminal device.
Figure 6B:
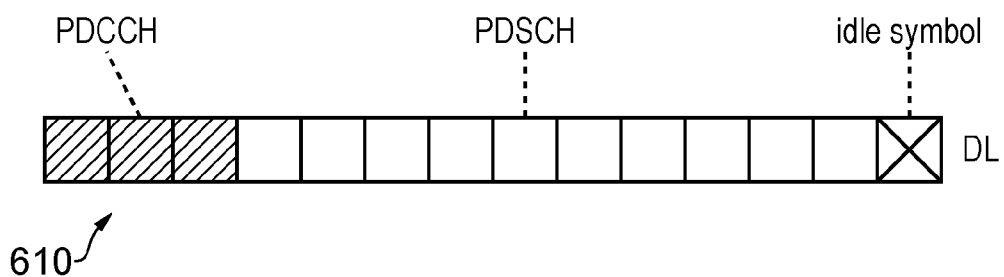
FIGS. 6B and 6C schematically represent the downlink subframe of FIG. 6 as received by two different types of terminal device in the wireless telecommunications system of FIG. 5.

FIG. 6B schematically represents a received subframe 610 which corresponds to how the smart phone terminal device 506 receives the subframe 600 transmitted by the base station 504. Because the smart phone 506 is operating on a half-duplex communication link 510, it cannot receive data in the last symbol of the downlink subframe for the reasons discussed above in relation to FIG. 4. That is to say, the smart phone 506 needs to cease reception of the downlink subframe before the end of the subframe is received so that it can ready the transceiver unit 506a for uplink transmission with suitable timing advance for the next subframe. Thus, so far as the smart phone 506 is concerned, the received subframe comprises three symbols supporting PDCCH, 11 symbols supporting PDSCH, and one idle symbol which cannot be received by the smart phone 506 operating in a half-duplex mode. Thus, in this example, communications between the base station 504 and the smart phone 506 are supported by the base station in a conventional manner as seen by the smart phone 506. This is because the smart phone 506 does not receive the last symbol of the subframe which is used by the base station for transmission of the separate low-rate channel, and as such the smart phone 506 in this example is unaware of the existence of this low-rate channel. Thus, it will be appreciated communications with a completely conventional terminal device 506 may be supported in this example embodiment.

However, as well as supporting conventional communications with the smart phone 506, and similar terminal devices, the base station 504 in accordance with this embodiment of the invention is also configured to support communications with the MTC device 508, and similar MTC devices, using the new separate low-rate channel supported by the last symbol of the downlink subframe which is not received by the smart phone 506. Thus, the base station may be generally seen as providing for the re-use of idle symbols that would otherwise represent a waste of resources because they are not received by terminal devices operating in a half-duplex mode in accordance with the conventional principles of an LTE telecommunications system.

Figure 6C:
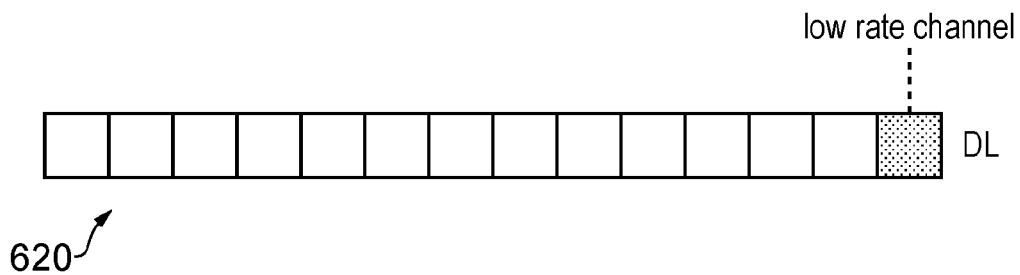

FIG. 6C schematically represents a received subframe 620 which corresponds to how the MTC terminal device 508 receives the subframe 600 transmitted by the base station 504. The MTC device is configured in accordance with an embodiment of the invention to in effect ignore the first 13 symbols of the subframe, and to only receive and decode data carried in the last symbol of the subframe. The MTC terminal device may establish the overall timing and frame structure based on broadly conventional techniques, for example using system information broadcast in the usual way, to identify and decode the last symbol of the subframe. In other embodiments an MTC terminal device may derive the relevant information in a different way, for example system information for the additional channel provided by the re-use of otherwise idle symbols may be carried on the additional channel itself. The base station 504 in this example includes a second scheduler 530 responsible for managing the allocations of resources on the additional separate low-rate channel to various terminal devices, such as the MTC device 508, supported by this channel.

Thus, in accordance with the principles set out above, the base station 504 is configured to support communications with a conventional terminal device, such as a smart phone 506, operating in a half-duplex mode in what the conventional terminal device sees as a conventional manner. However, the base station is further operable to support a new communication channel by making use of symbols that would otherwise be in effect wasted because they are ignored by conventional terminal devices receiving the downlink subframe when operating in a half-duplex mode. Thus, the overall effective downlink bandwidth of the telecommunications system is increased through more efficient use of the available resources. Specifically, for a base station supporting a half-duplex mode of operation with terminal devices requiring one idle symbol to allow sufficient time for switching between reception and transmission with appropriate timing advance there is an increase of over 7% in available downlink transmission resources (i.e. $1/13$).

In the example of FIGS. 5 and 6, the additional low-rate channel supported by the otherwise-idle symbols at the end of the downlink subframe for a base station supporting a half-duplex mode of operation is used to service a separate type of device, namely MTC-type devices. The specific manner in which downlink transmission resources associated with the additional low-rate channel are used to service the devices, i.e. the specific communication protocols and type of data transmitted, are not significant and there are a number of different ways in which the additional channel might be used to communicate with MTC devices. The additional channel may operate in a full duplex mode or a half duplex mode. For example, the additional channel may be in effect split into sub channels broadly corresponding to those of a conventional LTE system, for example PDCCH and PDSCH, for communicating with MTC devices. Symbols associated with the additional channel from a plurality of subframes may be combined together to in effect provide a subframe for the additional low-rate channel comprising a plurality of symbols, rather than just the idle symbols of a single subframe. That is to say, a transmission time interval (TTI) associated with the additional low-rate channel may span several subframes of the kind shown in FIG. 6A. For example, the idle symbols from 14 consecutive subframes may be considered as being grouped together to provide a quasi-subframe comprised of the 14 idle symbols. The quasi subframe comprising 14 idle symbols may then be used for communicating with MTC devices in broadly the same manner in which a conventional 14-symbol subframe, such as shown in FIG. 6A, is used to communicate with a conventional LTE terminal device. Thus, symbols associated with the new additional channel from a number of consecutive subframes may support a PDCCH-type sub-channel for MTC devices operating in accordance with an embodiment of the invention, whilst the remaining symbols from the quasi-subframe may be used to support a PDSCH-type sub-channel for the MTC devices.

However, as noted above, there are a number of different ways in which the additional resources associated with the otherwise-idle symbols may be re-used in accordance with embodiments of the invention and the specific manner associated with any particular implementation does not affect the underlying concept of using the otherwise-idle symbols to provide additional communication resources. That is to say, embodiments of the invention may provide an additional communication channel which makes use of otherwise-idle symbols associated with a base station operating in half-duplex mode, and this additional communication channel may be used for any of a number of different purposes.

In the above-described example, the additional communication channel is used for the transmission of low-rate communications to low-rate devices, for example a specific class of device such as MTC devices. The additional channel could thus be useful for supporting communications such as meter reading, actuator control and any of the other functions typically associated with MTC-type communications. In this way, a subframe can in effect be shared between high-rate devices (such as the first terminal device 506, namely the smart phone, of FIG. 5) and low-rate devices (such as the second terminal device 508, namely the MTC device, of FIG. 5) so that more of the available physical resources (i.e. OFDM symbols) can be used. In this implementation, the low-rate devices are in essence supported in the idle symbols of the high rate devices.

Another potential use for the additional communication channel is for the transmission of broadcast/multicast signaling to terminal devices in a dormant state (e.g. an RRC IDLE mode), furthermore, this may be done for any type of device. Terminal devices in a dormant state will not be actively transmitting or receiving, so there is no issue with them receiving the last symbol of a subframe, even in a half-duplex operating mode.

Another potential use for the additional communication channel is for the transmission of a signal indicating the presence, location and/or bandwidth of an additional carrier that a terminal device may camp onto in a telecommunications system. For example, there has been proposed a concept of so-called "virtual carriers" operating within the bandwidth of a "host carrier", for example, as described in co-pending UK patent applications numbered GB 1101970.0 [3], GB 1101981.7 [4], GB 1101966.8 [5], GB 1101983.3 [6], GB 1101853.8 [7], GB 1101982.5 [8], GB 1101980.9 [9] and GB 1101972.6 [10]. A main principle underlying the concept of a virtual carrier is that a frequency sub-region within a wider bandwidth host carrier is configured for use as a self-contained carrier, for example including all control signaling within the frequency sub region. An advantage of this approach is to provide a carrier for use by low-capability terminal devices capable of operating over only relatively narrow bandwidths. Thus, the additional communication channel may be used to communicate information regarding the existence/location/bandwidth of the virtual carrier (or other related carrier).

Another potential use for the additional communication channel in a telecommunications system supporting a virtual carrier (or other related carrier) is to carry signaling which provides an indication when/whether system information has changed for the host carrier. If system information has changed, terminal devices camped on to the virtual carrier could determine this from information signaled on the additional channel provided by the otherwise-idle symbols on the virtual carrier, and proceed to acquire the new system information from the host carrier. It can be helpful if there are terminal devices in active communication with the base station for the base station to ensure there are times at which those particular terminal devices are not scheduled for uplink to allow them to receive the additional channel occupying the otherwise idle symbol in the preceding subframe.

Another potential use for the additional communication channel in a telecommunications system supporting a virtual carrier (or other related carrier) is for providing an indication of the resources that are used for system information in the host carrier. That is to say, the last OFDM symbol of a subframe may in fact act as a PDCCH for system information in the host carrier.

Another potential use for the additional communication channel is for the transmission of paging messages to terminal devices in an idle mode. For example, terminal devices which are not actively communicating with the base station may be configured to read the last symbol in each subframe on an appropriate DRX cycle.

Another potential use for the additional communication channel is to in effect provide PDCCH resources for terminal devices in a subsequent subframe. The otherwise-idle symbol may thus provide extra PDCCH resource allowing more terminal devices to be allocated resources on PDSCH in a given downlink subframe. This may be particularly useful for a base station serving a relatively large number of MTC-type terminal devices, since it is expected these types of device will require only small amounts of data transmission, so many more could be served in a given sub frame if there are sufficient PDCCH resources available to allocate them. Alternatively, the otherwise-idle symbol at the end of one subframe may be used in order to reduce the number of PDCCH symbols required in the subsequent subframe, thereby allowing more of the subsequent subframe to be used for PDSCH.

Thus, as discussed above, there are a wide range of different uses for which the additional channel provided by the reuse of idle symbols associated with a half-duplex communications link may be employed.

In terms of how the additional channel occupying the otherwise-idle symbols may be handled within the telecommunications system, it may be treated as simply another available transport channel. A base station (e-nodeB) may transmit and receive the additional channel (in terms of physical layer processing as well as MAC, RLC and our RRC signaling) broadly in accordance with established techniques. Higher-layer control signaling (for example NAS signaling) could be handled by the telecommunications systems MME (as for conventional LTE communication channels) and user-plane data could come from the PDN-gateway and serving gateway (again, as for conventional LTE communications).

Figure 7:
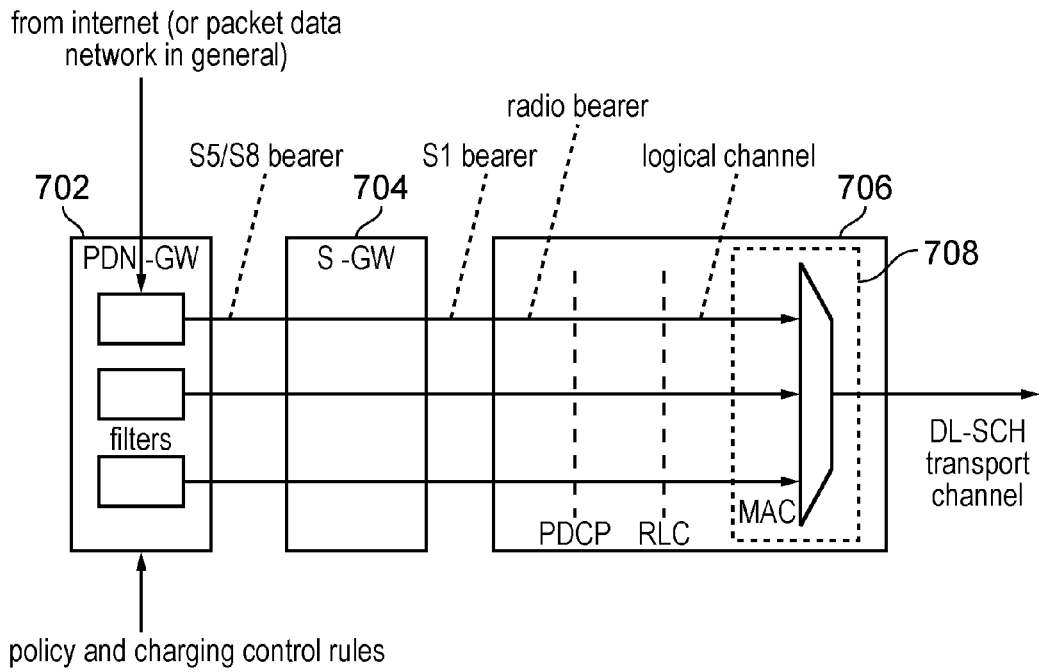
FIG. 7 schematically represents how data from a packet network may be mapped to transport channels in a conventional LTE-based wireless telecommunications system.

FIG. 7 schematically shows how data from a packet network (such as the Internet) may be mapped to transport channels in a conventional LTE system. In accordance with this standard scheme, data enters the telecommunications system via the PDN-GW 702. The PDN-GW implements a set of terminal device-specific policy and charging control (PCC) rules. These rules define how packets should be mapped to EPS bearers. For example, the rules might specify for TCP/IP traffic that packets with a certain IP source or destination address get mapped to a particular bearer, or packets with a certain TCP port number get mapped to a particular bearer, and so forth. The PDN-GW filters the incoming data based on these PCC rules into the different EPS bearers. There is a one-to-one mapping between these bearers and S5/S8 bearers connecting to the serving gateway (S-GW) 704, and then subsequent one-to-one mappings to corresponding S1 bearers from the S-GW to the base station 706, and to radio bearers and logical channels. The MAC entity 708 in the base station 706 then multiplexes these logical channels onto the DL-SCH transport channel (for DL data). It may be noted that splitting the data into radio bearers and logical channels allows the scheduler (in the base station) to prioritise transmission of data packets between different terminal devices, and also within a given terminal device. This allows, for example, the base station to choose to prioritise data associated with a radio bearer having stringent latency quality of service (QoS) requirements over data with less stringent latency requirements.

Figure 8:
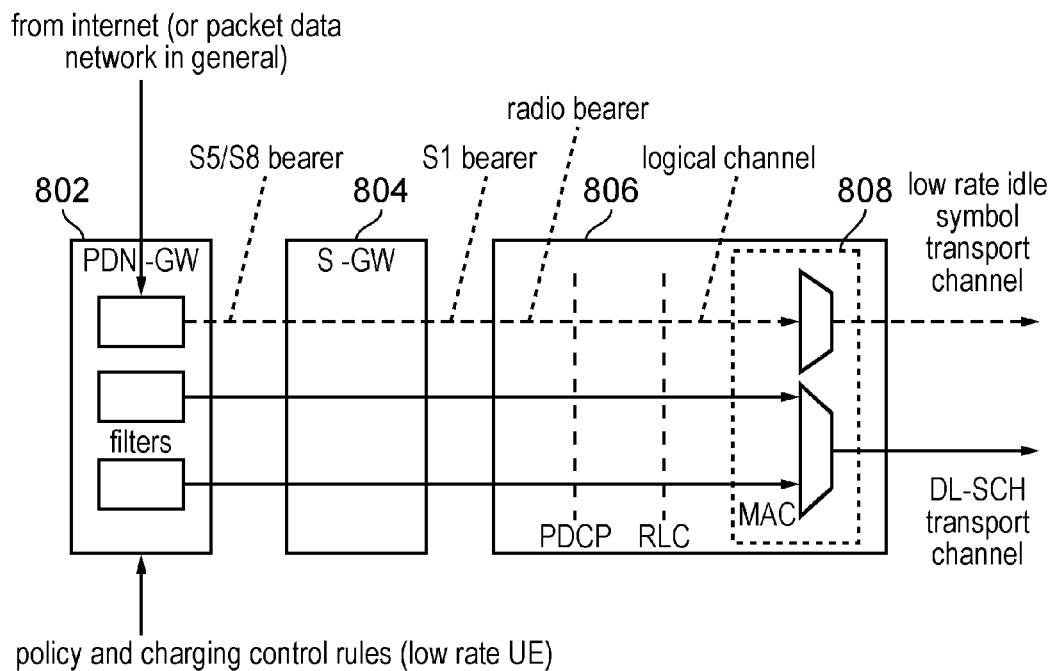
FIG. 8 schematically represents how data from a packet network may be mapped to transport channels in a wireless telecommunications system according to an embodiment of the invention.

FIG. 8 schematically shows how data from a packet network (such as the Internet) may be mapped to different channels in a LTE system operating in accordance with an embodiment of the invention. Many aspects of FIG. 8 are similar to, and will be understood from, how a standard system operates, such as shown in FIG. 7. Thus data enters the telecommunications system via a PDN-GW 802. As in a conventional system, the PDN-GW implements a set of terminal device-specific policy and charging control (PCC) rules defining how packets should be mapped to EPS bearers. The PCC rules in accordance with this embodiment of the invention are configured to cause low-rate MTC traffic to be mapped to the new low-rate channel supported by the otherwise-idle symbols and for any other traffic (for example traffic for the same device to be transmitted at higher rates) to be mapped to a conventional DL-SCH transport channel. There are a number of considerations that may be taken into account when deciding on the PCC rules for a given device. For a typically high-bandwidth device, such as a smart phone, its device specific PCC rules may not map any data to the low rate channel. For a device that can be fully supported using only low-rate communications, the PCC rules may only map data to the low rate channel (i.e. these devices would only be capable of using the low rate channel).

Once the PDN-GW 802 filters the incoming data based on the relevant PCC rules into the different bearers, there is a one-to-one mapping between these bearers and S5/S8 bearers connecting to a serving gateway (S-GW) 804, and then subsequent one-to-one mappings to corresponding S1 bearers from the S-GW 804 to the base station 806, and to radio bearers and logical channels. The bearers/channel associated with the additional channel which is supported by the otherwise-idle symbols are schematically represented in FIG. 8 by horizontal dashed lines. A MAC entity 808 in the base station 806 multiplexes the logical channels to two different transport channels, namely the low rate idle symbol transport channel and the DL-SCH transport channel as appropriate, as schematically shown in the figure.

It will be appreciated that various modifications can be made to the embodiments described above without departing from the scope of the present invention as defined in the appended claims. In particular although embodiments of the invention have been described primarily with reference to an LTE-based telecommunications system/mobile radio network, it will be appreciated that the present invention can be applied to other forms of network such as GSM, 3G/UMTS, CDMA2000, etc.

It will also be appreciated, that while only a single base station is shown in the wireless telecommunications system of FIG. 5, in practice there will be many base stations supporting different communication cells in the system. Some of these base stations may be operating in a half-duplex mode and provide functionality in accordance with the above-described principles, whereas some other base stations may be operating in a full-duplex mode and not provide functionality in accordance with the above-described principles. For base stations operating in a full-duplex mode the last symbol in each subframe may thus support the downlink shared channel in accordance with conventional LTE techniques.

While the above-description has focused on an example implementation in which a single symbol from each subframe is used to support the additional channel, in some circumstances, for example where a cell is large such that conventional terminal devices require two idle symbols to allow for sufficient timing advance, both idle symbols in the subframe may be used to support the additional channel. Alternatively each idle symbol may be used to support a separate additional channel.

Furthermore, while the above-description has focused on an example in which the conventional LTE-type communications employ an idle symbol at the end of the downlink subframe to allow time for transmit/receive switching and timing advance for terminal devices operating in half-duplex mode, in principle, an idle symbol could instead be provided at the beginning of an uplink frame. In this case, the first symbol(s) of a frame may thus be used to support an additional channel in broadly the same way as described above.

It will also be appreciated that the above-described embodiments based on an LTE frame structure comprising 14 symbols are merely some examples presented in the context of an LTE-type frame structure for which a normal cyclic prefix is applied. Embodiments of the invention are equally applicable to other frame structures, for example, an LTE-type frame structure for which an extended cyclic prefix is applied. This frame structure is associated with fewer symbols (12 instead of 14), but this does not impact the applicability of the principles described herein.

Furthermore still, it will be appreciated that whilst in the above-described examples the communications using the additional channel supported by the otherwise-idle symbols in a half-duplex operating mode and the communications using the other symbols in a subframe are supported by a single base station, in another implementation, the two types of communications might be supported by different base stations. For example, a second base station might be provided to support communications on the additional channel using resources corresponding to the otherwise-idle symbols in a half-duplex operating mode of a first base station. In this case, it may be beneficial for the first and second base stations to be synchronised, which can readily be achieved, for example based on inter base station signaling or externally provided synchronisation, for example from a core network part of the wireless telecommunications system or global positioning satellite timing signals.

In some example implementations it may be useful for a half-duplex base station to provide an indication to terminal devices that one or more symbols are being used to support the additional channel. This can help avoid any potential issues that may arise should a terminal device that does not need to rely on an idle symbol in any given subframe (for example, because it is not scheduled for uplink in a subsequent subframe) from trying to decode the additional channel on the assumption it is part of the terminal device's conventional PDSCH allocation. In other example embodiments where there is a potential for this situation occurring a base station may simply schedule terminal devices in such a way as to avoid the issue, for example when there are legacy devices in the cell that are unaware of the existence of the additional physical channel, the base station might not schedule the additional physical channel when there are legacy devices active and the base station does not know whether those legacy devices are going to insert an idle symbol during their reception process or not.

Thus, there has been described a telecommunications system comprising a plurality of base stations and a plurality of terminal devices arranged to communicate over a radio interface having a radio frame structure comprising radio subframes, wherein each radio subframe comprises a plurality of symbols. At least one symbol in each radio subframe is used to support a physical shared channel and at least one symbol in each radio subframe is used to support a physical control channel associated with the physical shared channel. A symbol at the end (or beginning) of each radio subframe is used to support the physical shared channel for communication links between a base station and a terminal device operating in a full-duplex mode, but the corresponding symbol is used to support a separate physical channel, for example an additional low-rate channel, for communication links operating in a half-duplex mode. Thus, transmission resources that would normally be idle in a half-duplex system as compared to a full-duplex system can in effect be re-used for another channel.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma H. and Toskala A, "*LTE for UMTS OFDMA and SC-FDMA based radio access*", John Wiley and Sons, 2009.
[2] ETSI TS 122 368 V10.530 (2011-07)/3GPP TS 22.368 version 10.5.0 Release 10)
[3] UK patent application GB 1101970.0
[4] UK patent application GB 1101981.7
[5] UK patent application GB 1101966.8
[6] UK patent application GB 1101983.3
[7] UK patent application GB 1101853.8
[8] UK patent application GB 1101982.5
[9] UK patent application GB 1101980.9
[10] UK patent application GB 1101972.6

The invention claimed is:

1. A terminal device for use in a telecommunications system comprising:
a plurality of base stations; and
a plurality of terminal devices arranged to communicate over a radio interface having a radio frame structure comprising radio subframes,
wherein each radio subframe comprises a plurality of symbols, and at least one symbol in each radio subframe is used to support a physical shared channel and at least one symbol in each radio subframe is used to support a physical control channel associated with the physical shared channel, and
wherein a symbol at the beginning or end of each radio subframe is used in a communication cell supporting terminal devices operating in a full-duplex communication mode to support the physical shared channel and is used in a communication cell supporting terminal devices operating in a half-duplex communication mode to support a different additional physical channel, wherein the terminal device is configured such that it is operable to communicate with a base station using the additional physical channel in a communication cell supporting terminal devices operating in a half-duplex communication mode.

2. The terminal device of claim 1, wherein the radio subframes are downlink radio subframes and the symbol supporting the additional physical channel in a communication cell supporting terminal devices operating in a half-duplex communication mode is at the end of the radio subframes.

3. The terminal device of claim 1, wherein the additional physical channel has a transmission time interval (TTI) spanning a plurality of radio subframes.

4. The terminal device of claim 1, wherein the terminal device is one of a subset of the plurality of terminal devices for which the additional physical channel is used to support communications.

5. The terminal device of claim 4, wherein the subset of terminal devices supported by the additional physical channel comprises machine-type communication (MTC) devices.

6. The terminal device of claim 4, wherein the subset of terminal devices supported by the additional physical channel comprises terminal devices in a dormant state.

7. The terminal device of claim 1, wherein the additional physical channel is used to support broadcast/multicast signalling.

8. The terminal device of claim 1, wherein the additional physical channel is used to indicate the availability of an additional carrier.

9. The terminal device of claim 8, wherein the additional physical channel is further used to indicate characteristics of the additional carrier.

10. The terminal device of claim 1, wherein the additional physical channel is used to indicate system information relating to the radio interface.

11. The terminal device of claim 1, wherein the additional physical channel is used to carry paging messages to terminal devices.

12. The terminal device of claim 1, wherein the additional physical channel in a radio subframe is used to provide control information for the physical shared channel in a subsequent radio subframe.

13. The terminal device of claim 1, wherein symbols associated with the additional physical channel from a plurality of radio subframes are treated as a group as a radio subframe associated with the additional physical channel.

14. The terminal device of claim 1, wherein the additional physical channel in one radio subframe provides an additional control channel for allocating transmission resources associated with the additional physical channel in other radio subframes for the terminal device.

15. The terminal device of claim 1, wherein a symbol adjacent to a symbol used to support the additional physical channel is also used to support the additional physical channel.

16. The terminal device of claim 1, wherein the terminal device is further operable to communicate with a base station using the physical control channel and the physical shared channel.

17. A method of operating a terminal device in a telecommunications system comprising a plurality of base stations and a plurality of terminal devices arranged to communicate over a radio interface having a radio frame structure comprising radio subframes, the method comprising:
sending data, using circuitry of the terminal device, to at least one base station of the plurality of base stations using a physical channel; and
receiving data, using circuitry of the terminal device, from the least one base station of the plurality of base stations using the physical channel,
wherein each radio subframe comprises a plurality of symbols, at least one symbol in each radio subframe is used to support a physical shared channel, which is different from said physical channel, and at least one symbol in each radio subframe is used to support a physical control channel associated with the physical shared channel,
wherein a symbol at the beginning or end of each radio subframe is used in a communication cell supporting terminal devices operating in a full-duplex communication mode to support the physical shared channel, and is used in a communication cell supporting terminal devices operating in a half-duplex communication mode to support the physical channel, and wherein said sending and receiving data using the physical channel is in a communication cell supporting terminal devices operating in the half-duplex communication mode.

18. The method of claim 17, wherein the radio subframes are downlink radio subframes and the symbol supporting the physical channel in a communication cell supporting half-duplex communications is at the end of the radio subframes.

19. The method of claim 17, wherein the physical channel has a transmission time interval (TTI) spanning a plurality of radio subframes.

20. The method of claim 17, wherein the terminal device is one of a subset of the plurality of terminal devices for which the physical channel is used to support communications.

21. The method of claim 20, wherein the subset of terminal devices supported by the physical channel comprises machine-type communication (MTC) devices.

22. The method of claim 20, wherein the subset of terminal devices supported by the physical channel comprises terminal devices in a dormant state.

23. The method of claim 17, wherein the physical channel is used to support broadcast/multicast signalling.

24. The method of claim 17, wherein the physical channel is used to indicate the availability of an additional carrier.

25. The method of claim 24, wherein the physical channel is further used to indicate characteristics of the additional carrier.

26. The method of claim 17, wherein the physical channel is used to indicate system information relating to the radio interface.

27. The method of claim 17, wherein the physical channel is used to carry paging messages to terminal devices.

28. The method of claim 17, wherein the physical channel in a radio subframe is used to provide control information for the physical shared channel in a subsequent radio subframe.

29. The method of claim 17, wherein symbols associated with the physical channel from a plurality of radio subframes are treated as a group as a radio subframe associated with the physical channel.

30. The method of claim 17, wherein the physical channel in one radio subframe provides an additional control channel for allocating transmission resources associated with the physical channel in other radio subframes for the terminal device.

31. The method of claim 17, wherein a symbol adjacent to a symbol used to support the physical channel is also used to support the physical channel.

32. The method of claim 17, wherein the terminal device is further operable to communicate with a base station using the physical control channel and the physical shared channel.

33. A terminal device arranged to communicate with a base station over a radio interface operating in a mode that supports half-duplex mode terminal devices, wherein the terminal device comprises:
- a processor; and
- a transceiver configured to communicate with the base station in the half-duplex mode via the radio interface by transmission and/or reception of radio subframes,
- wherein each radio subframe comprises a plurality of symbols, at least one symbol in each radio subframe is used to support a physical shared channel, and at least one symbol in each radio subframe is used to support a physical control channel associated with the physical shared channel, and
- wherein a symbol at the beginning or end of each radio subframe is used to support a different additional physical channel and is associated with another terminal device configured to communicate with the base station in a full-duplex mode, the different additional physical channel being a low-rate channel.

34. A method of operating a terminal device configured to communicate with a base station over a radio interface operating in a mode that supports half-duplex mode terminal devices, the method comprising:
- transmitting and/or receiving, using circuitry of the terminal device, provided radio subframes via the radio interface,
- wherein each radio subframe comprises a plurality of symbols, at least one symbol in each radio subframe is used to support a physical shared channel, and at least one symbol in each radio subframe is used to support a physical control channel associated with the physical shared channel, and
- wherein a symbol at the beginning or end of each radio subframe is used to support a different additional physical channel and is associated with another terminal device configured to communicate with the base station in a full-duplex mode, the different additional physical channel being a low-rate channel.

35. A base station configured to communicate over a radio interface having a frame structure comprising a plurality of subframes, the base station comprising:
- transceiver circuitry configured to
  - transmit data to a first terminal device using a physical channel,
  - transmit data to a second terminal device using a physical shared channel,
  - receive data from the first terminal device using the physical channel, and
  - receive data from the second terminal device using the physical shared channel; and
- control circuitry configured to control the transceiver circuitry,
- wherein each subframe includes a plurality of symbols, at least one symbol in each subframe being used to support the physical shared channel, which is different from said physical channel, and at least one symbol in each subframe being to support a physical control channel associated with the physical shared channel,
- wherein the at least one symbol to support the physical shared channel supports the physical shared channel in a first communication cell supporting the second terminal device operating in a half-duplex communication mode,
- wherein a symbol at the end of each subframe, which is different from said at least one symbol supporting the physical shared channel and said at least one symbol supporting the physical control channel, supports the physical channel in a second communication cell supporting the first terminal device operating in a full-duplex communication mode,
- wherein the base station is in the second communication cell, and
- wherein the physical shared channel provides for a communication rate higher than a maximum communication rate provided by the physical channel.

36. A base station configured to communicate with a first set of terminal devices over a first wireless interface operating in a first mode that supports half-duplex mode terminal devices and with a second set of one or more terminal devices over a second wireless interface operating in a second mode that supports full-duplex mode terminal devices, the base station comprising:
  transceiver circuitry configured to
    provide subframes for transmission; and
    transmit the subframes via one of the first wireless interface to the terminal devices of the first set operating in a half-duplex mode and the second wireless interface to the terminal devices of the second set operating in a full-duplex mode; and
  control circuitry configured to control the transceiver circuitry,
  wherein each subframe includes a plurality of symbols, at least one symbol in each subframe supports a physical shared channel, and at least one symbol in each subframe supports a physical control channel associated with the physical shared channel,
  wherein a symbol at the end of each subframe, which is different from said at least one symbol supporting the physical shared channel and said at least one symbol supporting the physical control channel, supports an additional physical channel, and
  wherein the physical shared channel provides for a communication rate higher than a maximum communication rate provided by the additional physical channel.

* * * * *